United States Patent
Wolff

[19]

[11] Patent Number: 5,933,772
[45] Date of Patent: Aug. 3, 1999

[54] CLOSED COIN HOLDER FOR ATTACHMENT TO PAGER

[75] Inventor: Stephen H. Wolff, New York, N.Y.

[73] Assignee: Wolff Marketing Group, Inc., New York, N.Y.

[21] Appl. No.: 08/695,119

[22] Filed: Aug. 5, 1996

[51] Int. Cl.[6] .................................................. H04B 1/08
[52] U.S. Cl. .......................... 455/351; 455/90; 455/347; 206/0.8; 206/0.81
[58] Field of Search .................................... 206/0.81, 0.8; 455/90, 11, 95, 344, 347, 349, 351, 556

[56] References Cited

U.S. PATENT DOCUMENTS

| | | | |
|---|---|---|---|
| D. 387,762 | 12/1997 | Mandel | D14/191 |
| 3,138,244 | 6/1964 | White | 206/0.81 |
| 3,262,478 | 7/1966 | Amsterdam | 150/37 |
| 3,797,649 | 3/1974 | Ringle | 206/0.82 |
| 4,327,512 | 5/1982 | Oliver | 206/0.81 |
| 4,880,712 | 11/1989 | Gordecki | 429/97 |
| 5,148,150 | 9/1992 | White et al. | 340/571 |
| 5,511,390 | 4/1996 | Mah | 63/1.1 |
| 5,589,812 | 12/1996 | Jones | 340/309.15 |

OTHER PUBLICATIONS

NatCom Marketing Communications press release entitled "Low–Tech Accessory Improved Hi–Tech Communications" dated Jul. 28, 1994.

P. 25 from AG Findings 1995 Catalog.

*Primary Examiner*—Wellington Chin
*Assistant Examiner*—Lee Nguyen
*Attorney, Agent, or Firm*—Lerner, David, Littenberg, Krumholz & Mentlik, LLP

[57] ABSTRACT

A coin holder can hold coins for use in making a telephone call or paying a toll or fare. The coin holder can be attached to any item in any suitable manner, and is quite suitable for attachment to an electronic pager on which individuals are often summoned to make phone calls. The coin holder has an interior and a cover which conceals the coin or coins held in the coin holder. The coin holder can be a piece which is attachable to any item or can be an integral part of the item itself, such as in the instance of an electronic pager, where the housing for the pager can form the interior of the coin holder and a releasably securable cover can be provided to cover that interior and conceal the coin or coins held therein. The housing surface may or may not be altered to accommodate the coin or coins. Where it is not altered, the coin or coins can simply be held against the housing surface. A latching mechanism may include an undercut and a boss member.

21 Claims, 4 Drawing Sheets

CLOSED COIN HOLDER FOR ATTACHMENT TO PAGER

BACKGROUND OF THE INVENTION

The present invention relates generally to coin holders, and more specifically to coin holders adapted for use in connection with pagers or any other portable item, electronic or not, where it would be desirable to have readily available a coin, whether it be U.S. currency, a subway token, a toll token, etc.

With the popularity of electronic pagers, sometimes referred to as beepers, and other portable items carried with individuals, it is useful to have a holder for coins of any type which might be needed in an emergency or simply as a reserve. The coins to be held could be monetary for making a telephone call, or be tokens for a subway, a roadway or bridge toll, etc. In addition to pagers, coin holders might be useful on a child's or student's backpack, lunch box or gym bag, on the inside of a hat, anywhere on an article of clothing, etc.

A pager is a natural place for a coin holder since one normally makes a phone call after being paged. For a child, the backpack, gym bag or lunch box might be a natural place to keep a spare coin or spare coins for an emergency or to call for a ride, since these are items which children typically carry from the time they leave home until they return home. Also, the money is kept separately from lunch money and out of sight of others so that the spare coin is always available for the child's use.

The present invention provides a coin holder which can be used conveniently to hold a coin or coins safely and securely, i.e., so that the coin cannot be easily lost and also so that the coin cannot be seen by others. The present invention also provides a coin holder with a place for one's name, a place for advertising or promotional material, and a place for emergency numbers.

SUMMARY AND OBJECTS OF THE INVENTION

It is an object of the present invention to provide a coin holder which can be attached to an electronic pager or any other portable item.

It is an other object of the present invention to provide a coin holder which is attachable to an electronic pager or other portable item, and also includes the feature of being able to conceal the coin or coins held therein.

It is another object of the present invention to provide an electronic pager having integrally formed in its housing at least a portion of a coin holder.

The above and other objects of the present invention can be fulfilled by providing a coin holder which includes a structure or combination of structures to hold a coin or coins, and such coin holder is attachable to an electronic pager or other device. In another embodiment, the housing of an electronic pager would have at least a portion of the structure or structures required to hold a coin or coins built integrally therein.

Additionally, a coin holder can be provided with a base member having an interior of a size adequate to accept at least one coin, a cover member provided to close such interior, and a releasable fastener to releasably lock the cover member to the base member. The coin holder also preferably includes a fastener for fastening it to an electronic pager. That fastener could be the integral formation of the holder in the pager housing.

The holder may also include a dedicated area for writing numbers or other information which might be used when the coin held in the coin holder is needed.

In addition, the coin holder may also include a dedicated area for numbers or other information which is on the inside of the cover member so that it cannot be seen when the cover member is in the closed position.

The coin holder may also have on the outside thereof a dedicated area to write the name of the owner of the coin holder or any other information, including an area for promotional or decorative material.

The cover member of the holder is preferably hingably attached to the base member by a living hinge made of the same material of which the base and cover members are made.

The coin holder may also have a base member which is a shell member having an inside and outside, and a fastener is provided on the outside of the shell holder for fastening the coin holder to an item. That fastener may be double-backed tape, or may be feet for insertion, in a snap-fit arrangement, into holes in the pager or other item to which the coin holder is to be attached, or any other suitable fastener.

The releasable fastener used to releasably lock the cover member to the base member may comprise an undercut in a portion of the base member and a boss member at a corresponding portion of the cover member. The undercut portion in the base member may include a ramped member above the undercut which is adapted to bear against the boss member of the cover member when the cover member is being pushed into the closed position, the ramp member facilitating the elastic deformation of the cover carrying the boss member. The cover member may also include a slot above the boss member, on the inside of the cover, such slot also facilitating a latching of the cover member to the base member.

The base member of the coin holder may also be formed integrally with the housing of the pager or other item. A variety of different closure options can be used with such an integrally formed base, and such closure options may fully or partially cover the coin held in the holder. For instance, a sliding cover, a rotating cover, or a hinged cover may be employed. Alternatively, a cover member which only partially covers a coin held in the coin holder could be integrally formed with the housing of the pager or other item, with or without additional changes in the back portion of the holder (the surface of the pager or other item) against which the coin is held by the integral cover. As even a further variation, the cover may be such that it simply snaps into the pager housing, with or without further variation of the housing other than holes to receive, in a snap-fit arrangement, feet on the back of the cover.

The present invention also relates to an electronic pager for receiving electronic signals, wherein the electronic pager comprises a plastic housing and an interior formed integrally with said plastic housing, set in the interior being sized to receive at least one coin, a cover member to the cover the interior, and a releasable fastener for releasably fastening the cover to the pager so as to close the interior and to conceal the coin or coins therein.

BRIEF DESCRIPTION OF THE DRAWINGS

The above and other advantages of the coin holder will be more readily apparent, as will other objects and advantages, from a review of the drawings in which.

DETAILED DESCRIPTION

Figure 1:
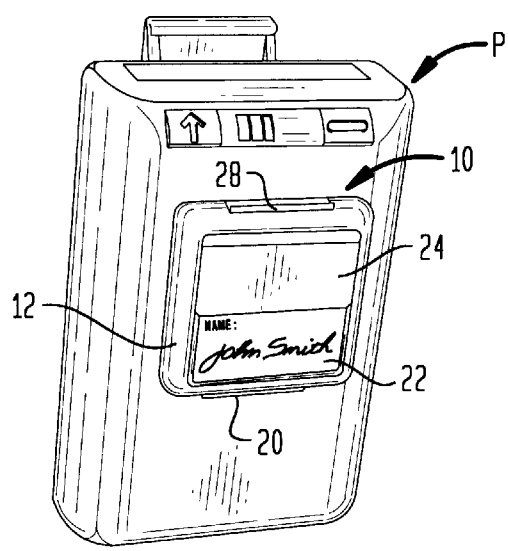
FIG. 1 is a front perspective view of a pager having a coin holder thereon.
Figure 2:
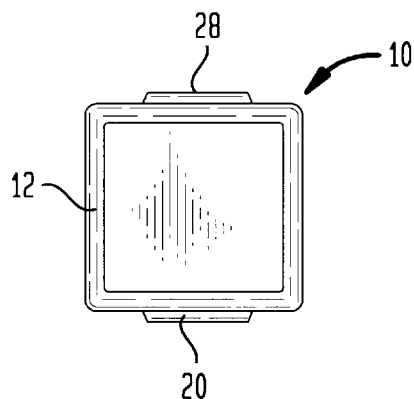
FIG. 2 is a front elevational view of the coin holder in accordance with the present invention.

FIG. 1 shows a pager P on which there is mounted a coin holder 10 in accordance with the present invention. The holder 10 is preferably made of a plastic material such as PVC or any other suitable polymeric material. The coin holder is shown more specifically in FIGS. 2–4, and it includes a front shell 12 and a rear shell 14. The shells are preferably substantially planar so that they do not protrude very much from the surface on which they are mounted. Also, the shells are preferably substantially rigid.

Figure 4:
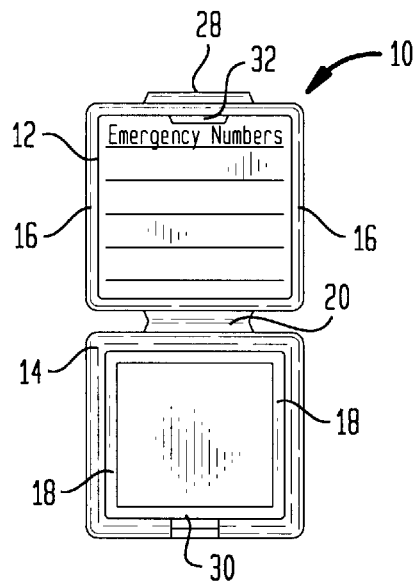
FIG. 4 is a front elevational view of a coin holder in accordance with the present invention with the holder in the closed position.

As can be seen in FIG. 4, a short wall 16 extends around the perimeter of the shell 12 to form an interior. This can also be seen in FIG. 6. The rear shell 14 also includes a perimeter wall 18, though the perimeter wall 18 is set inward from the outside perimeter of the rear shell 14. This can be seen in both FIGS. 4 and 6. The outside perimeter of the rear shell 14 is designed to be contiguous with the outside surface of the perimeter wall 16 on the front shell 12 when the coin holder is in the closed position. The inside surface of the wall 16 of the shell 12 meets with the outside of the perimeter wall 18 of the shell 14.

Figure 3:
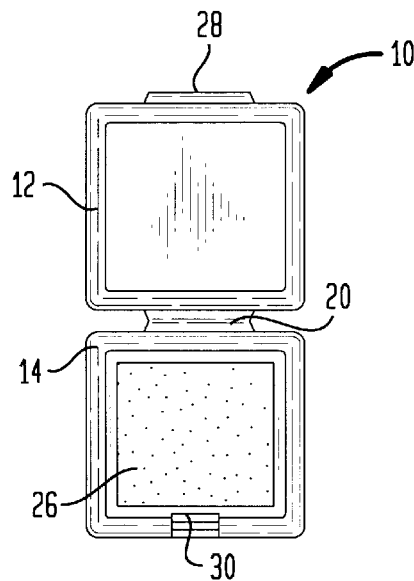
FIG. 3 is a rear elevational view of a coin holder in accordance with the present invention with the holder in the open position.

As can best be seen in FIGS. 3 and 4, a thin plastic hinge, i.e., a living hinge, is provided between the shells 12 and 14, this hinge allows the shells to be brought together so that the holder is in a closed position or away from one another so that the holder is in an open position. The living hinge is preferably made of the same plastic as the shells. The holder 10 includes on the front surface (which is the outside surface of the front shell 12) a space 22 for a name and perhaps an address or other personal information, as well as a space 24 for promotional indicia or other designs, nothing being shown in that area in the present drawings. Paper adhered to the plastic or any other material which will take ink, is preferred for this area.

The coin holder 10 also includes adhesive tape on the back surface, i.e., the outside surface of the rear shell 14. This can be seen in FIG. 3. Double backed adhesive tape is particular useful for this purpose since the paper covering the adhesive portion will protect the item until it is ready to be used. Of course, any suitable fastening means can be used. Such fastening means might include velcro, a snap system, or even a structure on the rear shell 14 having slots through which a strap could be looped. In addition, the coin holder could be molded directly into the case of a pager such that it appears substantially as shown in FIG. 1. However, the shell 14 might be molded into the plastic housing which surrounds the electronics of the pager, and the shell 12 could still be openable to gain access to the coins. In another embodiment the shell 12 might be slidably openable to open a compartment in the housing of the pager.

The holder 10 also includes, as shown in FIG. 4, a place for emergency or other numbers or other information to be written. This area should be made of a material which will take ink or pencil. Paper adhered to the plastic is preferred, but any other suitable material will do. This is particularly useful since the coin being held in the coin holder 10 may be used for a phone call, and the emergency or other numbers would therefore be at the user's fingertips. Of course, the number kept in the holder 10 need not be "emergency" number, but may just be numbers which might be needed by the user. This area is on the inside of the front shell 12 in the figures, but can be anywhere.

Figure 5:
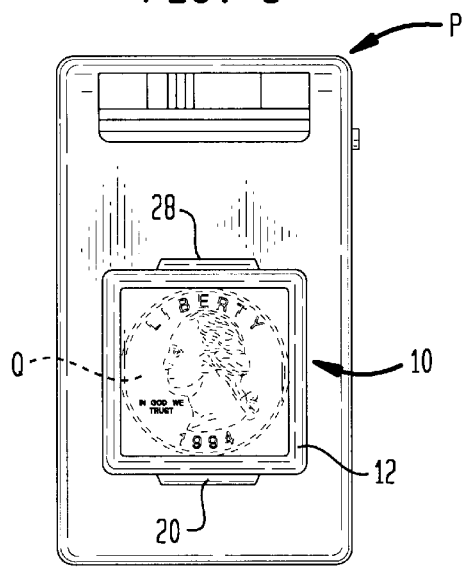
FIG. 5 is a front elevational view of a pager having a coin holder in accordance with the present invention attached thereto, illustrating in phantom a coin held within the coin holder.

In FIG. 5, the coin holder 10 is shown in the closed position on a pager P. Shown in phantom on FIG. 5 there is a representation of a coin Q within the holder 10. In this position, the coin Q is held securely to the pager until it is needed. Also, because the shells are substantially planar, the holder 10 does not protrude very much from the pager as can be seen in FIGS. 1 and 6.

Figure 6:
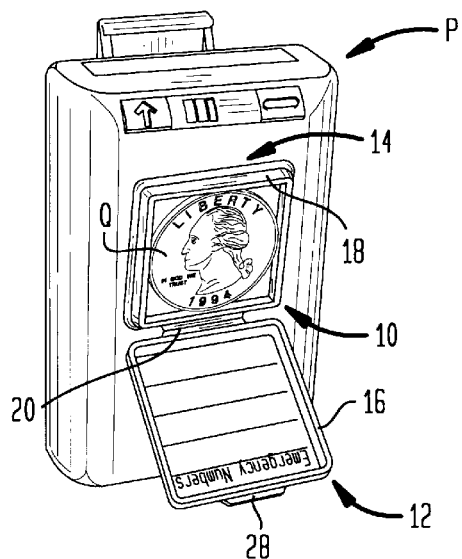
FIG. 6 is a front perspective view of a pager having an opened coin holder attached thereto.

FIG. 6 shows the coin holder 10 in an open position where the coin Q is accessible to the user. The user can now make a phone call, or if the coin Q is a token, can use the token wherever it is needed.

Figure 7:
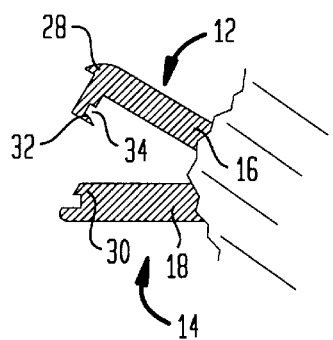
FIG. 7 is a partial cross-sectional and enlarged view of the latching mechanism on the coin holder.

The opening and closing of the coin holder 10 is simple, and it is facilitated by a finger grip 28 at the top portion of the shell 12. The locking mechanism for temporarily locking the shell 12 to the shell 14 can be of any suitable type. In the preferred embodiment herein, the locking mechanism includes an undercut at 30 in the shell 14, which works together with a boss 32 on the inside of the shell 12, which is aligned with the undercut 30 in the shell 14. In addition to the boss 32, there can also be provided a recess 34, shown in FIG. 7, which also cooperates with the undercut 30 on the shell 14. Also, the undercut 30 includes, built into the wall 18, a ramped surface so that the materials bear against one another and there is an audible snap upon the closure of the coin holder.

Figure 8:
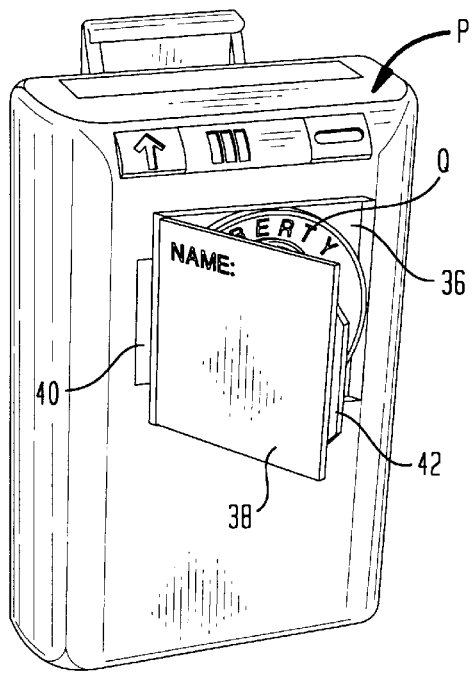
FIG. 8 is a perspective view of another embodiment of a pager having a coin holder.

FIG. 8. illustrates yet another embodiment of the present invention. Here, the pager housing includes a recessed portion 36. The recessed portion 36 is integrally formed with the housing, and includes sufficient interior space to hold a coin such as coin Q shown therein. Also, in this embodiment, a cover 38 is provided to close the interior recessed portion 36 and to conceal the coin Q when it is present. In this embodiment, the cover is connected to the housing of the pager P by a hinge which may be of any suitable type, include a snap-in hinge (having bosses at the top and bottom left edges which snap into small recesses in the corners of the recessed portion 36), a multi-piece hinge (one with a separate hinge pin), or a living hinge (as discussed above). Also, a tab 42 is provided on the side of cover 38 which is opposite to the hinge 40. This tab is associated with the housing of pager P in order to close the cover 38. As in previous embodiments, any suitable type of snap-fit closure arrangement can be provided, and also a finger grip can be provided as well to facilitate the opening of the cover 38.

Figure 9:
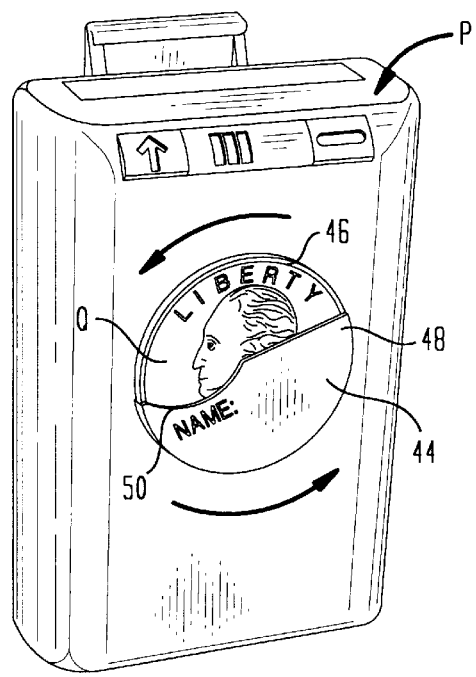
FIG. 9 is a perspective view of yet another embodiment of a pager having a coin holder.

FIG. 9 shows yet another closure option, generally designated as 44. The closure 44 is a cover which is associated with a recessed portion 46. The cover 44 provides only partial, though substantial, coverage of coin Q held within the recessed portion 46. The cover 44 covers, in the closed position, approximately two thirds (⅔) to three quarters (¾) of the coin Q, and is rotatably slidable into the housing of the pager P in the direction of the arrows (which are shown for directional purposes only). The cover 44 is pivotally rotatable about a pivot point 48 (which is not shown but may be of a conventional variety). The cover 44 also provides a finger rest at 50, and when one's finger is used in this finger rest (i.e., pushes down), the cover 44 can be rotated so that coin Q can be placed into the recessed portion 46 or coin Q can be removed from the recessed portion 46.

Figure 10:
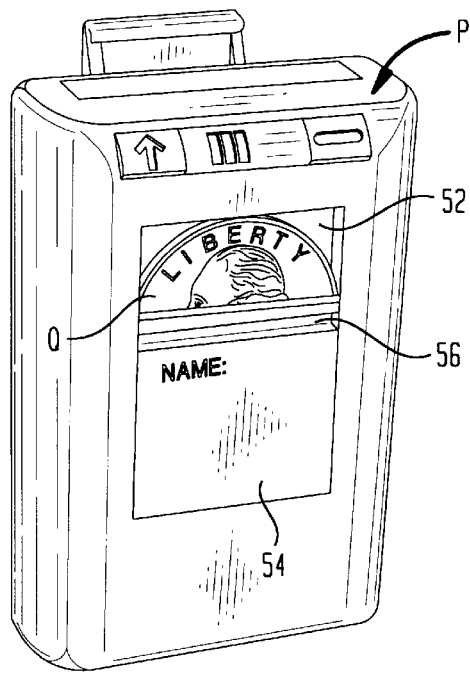
FIG. 10 is a perspective view of yet another embodiment of a pager having a coin holder.

In FIG. 10, a recessed portion 52 (which is similar to the recessed portion 36 shown in FIG. 8) is provided in the housing of pager P. A panel 54 is provided as a closure to fully cover and conceal the coin Q. Panel 54 includes a finger grip 56, and the sides of the panel 54 are associated with the housing of pager P such that the panel can slide up and down to open and close the interior formed by the recessed portion 52. As in previous embodiments, any suitable arrangement for providing the sliding motion of the panel 54 can be employed. For instance, a tongue (on the edges of panel 54) can ride in a groove (on the sides of the panel 54 at the edges of or outside of the recessed portion 52). Also, any suitable latching mechanism can be provided to latch the panel 54 in the closed position.

With regard to the above-discussed embodiments that have movable cover members, any suitable arrangement can be provided. For instance, covers such as batter covers in TV remote controls, stereo equipment, etc. may be provided. Also, covers which are entirely removable from the housing of the pager P are also contemplated. Thus, whether slidably removable or removable in any other fashion, such as threaded removal, are envisioned by the present invention.

Figure 11:
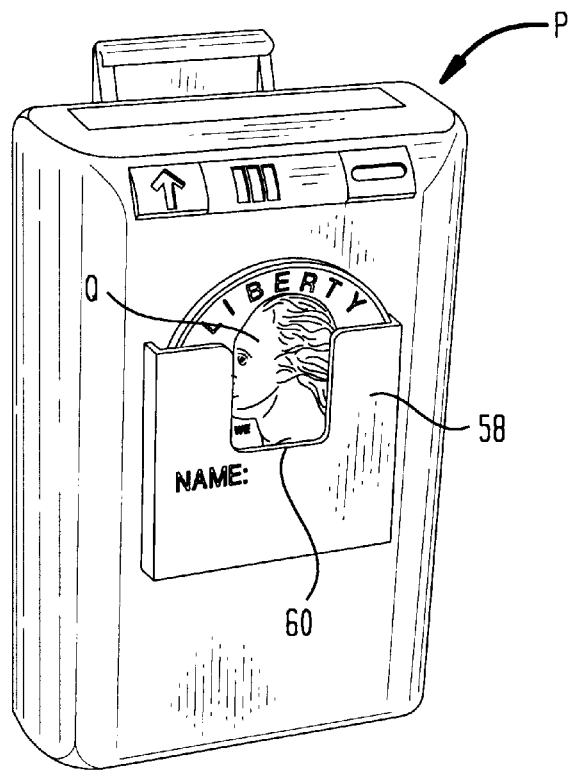
FIG. 11 is a perspective view of yet another embodiment of a pager having a coin holder.

FIG. 11 shows yet another embodiment, in which a cover member 58 is either integrally formed with the housing of pager P or provided as a separate piece which can be snapped into place on the housing of pager P. The cover 58 can hold a coin Q next to the pager and, in the illustrated embodiment, only partially covers the same, though an arrangement by which the coin Q is fully covered and/or concealed may be provided. Also, the housing of pager P may or not be altered to provide an interior for the coin Q. If it is altered, the cover 58 can be provided more closely against the housing of the pager P since the recessed portion would provide additional room for the coin Q. The cover 58 also provides a finger slot 60 in the center to facilitate the insertion and removal of the coin Q.

Figure 12:
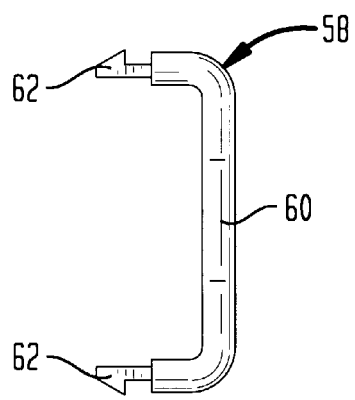
FIG. 12 is a top view of separate cover member adapted to be snapped into place into the housing of a pager.

In the instance in which the cover 58 is a separate piece which is to be snapped into place on the housing of pager P, FIG. 12 illustrates one way in which that attachment can take place. FIG. 12 thus shows the separate cover piece 58 which includes feet 62 along its edges which extend outwardly and include a bevelled edge to facilitate insertion into holes which can be provided, in registration with such feet 62, in the housing of the pager P. This arrangement allows the edges to sit flush on the housing of pager P. Alternatively, the cover piece 58 can be attached to the housing by adhesive.

The coin holder in accordance with the present invention may also be a thin flexible plastic sleeve made up of a front layer and a back layer joined at the bottom and two sides, with an opening at the top with a finger slot in the front layer. Adhesive (e.g., double-backed tape) can be used on the back layer.

While the foregoing description and figures illustrate some preferred embodiments of the coin holder in accordance with the present invention, it should be appreciated that certain modifications may be made and are encouraged to be made in this structure, arrangement and materials of the disclosed embodiments without departing from the spirit and scope of the present invention which is defined by the claims which are set forth below.

We claim:

1. A coin holder attachable to a pager, comprising a base member having an interior of a size adequate to accept at least one coin and being fixable together with the pager, a cover member provided to close such an interior, and thereby conceal the coin or coins being held therein, and a releasable fastener to releasably lock the cover member to the base member in a closed position and to release the cover member from said closed position while the base member remains attached to the pager, wherein the cover member is hingably attached to the base member by a living hinge, and wherein the base member is a shell member having an inside and an outside, and further including double backed tape on the outside of the shell member for attaching the coin holder to an item.

2. The coin holder in claim 1, further including a dedicated area for writing numbers or other information which might be used when the coin held in the coin holder is needed, wherein the dedicated area for numbers or other information is on the inside of the cover member such that it cannot be seen when the cover member is the closed position on the base member.

3. The coin holder in claim 2, wherein there is provided on the outside of the cover member a dedicated area to write the name of the owner of the coin holder, as well as a dedicated area for promotional or decorative indicia or material.

4. The coin holder in claim 1, wherein the releasable fastener comprises an undercut in a portion of the base member and a boss member at a corresponding portion of the cover.

5. The coin holder in claim 4, wherein the base member and cover member are substantially planar members, and together, when in the closed position, define the holder which also is of a substantially planar construction.

6. The coin holder in claim 5, wherein the base member and the cover member are substantially rigid members, made of plastic.

7. The coin holder in claim 6, wherein the base member and the cover member have exterior surfaces, and when the holder is in the closed position, the exterior surfaces around the perimeter of the holder is contiguous from the base member to the cover member, the holder appearing, substantially, to be a single piece of plastic.

8. The coin holder in claim 4, wherein the undercut portion on the base member includes above the undercut a ramped member which is adapted to bear against the boss member of the cover when the cover is being pushed into the closed position, the ramp member facilitating the elastic deformation of the portion of the cover carrying the boss member.

9. The coin holder in claim 4, wherein the cover also includes a slot above the boss member, such slot also facilitating the latching of the cover to the base member.

10. The coin holder in claim 1, wherein the base member is integral with the housing of the pager.

11. The coin holder in claim 1, wherein the cover member is a separate piece from the base member, the base member is integral with the housing of the pager, and said cover member is attached to the base member to form the interior.

12. An electronic pager for receiving signals, comprising a plastic housing and a cover member, said housing of said pager and said cover together defining an interior, said interior being sized to receive at least one coin and being positioned at a location on said pager which permits access to a coin held therein while the pager is being worn, said cover member to fully cover said interior and to conceal the coin or coins therein, and further comprising a releasable closing fastener for releasably fastening the cover member to the pager so as to permit the selective opening and closing of said interior.

13. The pager in claim 12, wherein said cover member is slidably attached to said housing for slidable movement from an open position to a closed position.

14. The pager in claim 12, wherein said cover member is hingably connected to said housing of said pager for hingable movement from a closed position to an open position.

15. The pager in claim 12, wherein said cover member is slidably attached to said housing for slidable movement from an open position to a closed position.

16. The pager in claim 12, wherein said cover member is hingably connected to said housing of said pager for hingable movement from a closed position to an open position.

17. The pager in claim 12, wherein said cover member is integrally formed with said housing of said pager.

18. The pager in claim 12, wherein said cover member is a separate piece from said housing of said pager, and said cover member is attached to said housing member.

19. The pager in claim 18, wherein said cover member partially covers a coin Q held in the interior.

20. The pager in claim 12, wherein said plastic housing includes a recessed portion which together with said cover member defines said interior.

21. An electronic pager for receiving signals, comprising a plastic housing and a cover member, said housing of said pager and said cover together defining an interior, said interior being sized to receive at least one coin, said cover member to fully cover said interior and to conceal the coin or coins therein, wherein said cover member partially covers said coin while in said closed position, and is pivotally attached to said housing of said pager for rotating movement between an open position and a closed position.

* * * * *

UNITED STATES PATENT AND TRADEMARK OFFICE
CERTIFICATE OF CORRECTION

PATENT NO. : 5,933,772
DATED : August, 3, 1999
INVENTOR(S) : Wolff

It is certified that error appears in the above-identified patent and that said Letters Patent is hereby corrected as shown below:

Column 1, line 44, "an other" should read --another--

Column 4, line 61, "include" should read --including--

Column 6, line 34, "is the" should read --is in the--

Column 6, line 55, "holder is" should read --holder are--

Signed and Sealed this

Eighth Day of February, 2000

Attest:

Q. TODD DICKINSON

*Attesting Officer*   *Commissioner of Patents and Trademarks*